US010173567B2

(12) United States Patent
Madrigal et al.

(10) Patent No.: US 10,173,567 B2
(45) Date of Patent: Jan. 8, 2019

(54) LIGHTWEIGHT HEADRESTS WITH SUSPENSION MESH AND SUPPORTING FRAME

(71) Applicant: Zodiac Seats US LLC, Gainesville, TX (US)

(72) Inventors: Jose Madrigal, Santuario Chihuahua (MX); Ty Parker, Sanger, TX (US); Patricia Luevano, Chih (MX)

(73) Assignee: Zodiac Seats US LLC, Gainesville, TX (US)

( * ) Notice: Subject to any disclaimer, the term of this patent is extended or adjusted under 35 U.S.C. 154(b) by 0 days.

(21) Appl. No.: 15/319,592

(22) PCT Filed: Jun. 16, 2015

(86) PCT No.: PCT/US2015/036013
§ 371 (c)(1),
(2) Date: Dec. 16, 2016

(87) PCT Pub. No.: WO2015/195653
PCT Pub. Date: Dec. 23, 2015

(65) Prior Publication Data
US 2017/0320418 A1 Nov. 9, 2017

Related U.S. Application Data

(60) Provisional application No. 62/012,799, filed on Jun. 16, 2014.

(51) Int. Cl.
*B60N 2/70* (2006.01)
*B60N 2/80* (2018.01)
(Continued)

(52) U.S. Cl.
CPC .............. *B60N 2/7011* (2013.01); *B60N 2/80* (2018.02); *B60N 2/803* (2018.02); *A47C 7/38* (2013.01);
(Continued)

(58) Field of Classification Search
CPC ..... B60N 2/7011; B60N 2/803; B60N 2/4802
(Continued)

(56) References Cited

U.S. PATENT DOCUMENTS 6,412,872 B2 * 7/2002 Takeda ................. B60N 2/4847
297/391
6,843,530 B1 * 1/2005 Wu .......................... A47C 7/38
297/284.3
(Continued)

FOREIGN PATENT DOCUMENTS

WO 2006131717 A1 12/2006
WO 2007109872 A1 10/2007
WO 2015195653 A1 12/2015

OTHER PUBLICATIONS

International Patent Application No. PCT/US2015/036013, Search Report and Written Opinion, dated Sep. 21, 2015.

*Primary Examiner* — Syed A Islam
(74) *Attorney, Agent, or Firm* — Kilpatrick Townsend & Stockton LLP; Dean W. Russell; Melissa L. Love

(57) ABSTRACT

Described are lightweight headrests with a perimeter frame 200 with an open central region. The open central region is spanned by a suspension membrane 100 held in tension. The suspension membrane provides support and cushioning functions to a passenger head without the need for internal structures or compression cushions. The perimeter frame of the headrest may have additional cross members spanning (Continued)

the rear portion of the headrest. These cross members may provide additional structure or locate attachment points for the headrest onto the seat.

24 Claims, 7 Drawing Sheets

(51) Int. Cl.
  B60N 2/803 (2018.01)
  *B64D 11/06* (2006.01)
  *A47C 7/38* (2006.01)
(52) U.S. Cl.
  CPC .... *B60N 2002/899* (2018.02); *B64D 11/0646* (2014.12); *B64D 11/0647* (2014.12); *B64D 11/0649* (2014.12)
(58) Field of Classification Search
  USPC ........................................................ 297/391
  See application file for complete search history.

(56) References Cited

U.S. PATENT DOCUMENTS

| | | | |
|---|---|---|---|
| 7,303,232 B1* | 12/2007 | Chen | A47C 7/38 297/284.7 |
| 7,425,039 B2* | 9/2008 | Lin | A47C 31/023 297/452.56 |
| 7,690,729 B2* | 4/2010 | Liao | A47C 7/38 297/408 |
| 8,029,066 B2* | 10/2011 | Su | A47C 31/023 297/440.11 |
| 8,038,212 B2* | 10/2011 | Vickers | B60N 2/2821 297/250.1 |
| 8,662,591 B2* | 3/2014 | Lin | A47C 7/38 297/391 |
| 2005/0127735 A1 | 6/2005 | Munsch | |
| 2007/0257537 A1* | 11/2007 | Asbury | A47C 7/38 297/391 |
| 2008/0122284 A1* | 5/2008 | Yang | A47C 7/282 297/452.56 |

* cited by examiner

LIGHTWEIGHT HEADRESTS WITH SUSPENSION MESH AND SUPPORTING FRAME

CROSS REFERENCE TO RELATED APPLICATIONS

This application is the U.S. national phase entry of International Patent Application Serial No. PCT/US2015/036013 ("the '013 application"), filed on Jun. 16, 2015, which application is related to and claims priority benefits from U.S. Provisional Application Serial No. 62/012,799 ("the '799 application"), filed on Jun. 16, 2014, entitled "Suspension Mesh Headrest". The '013 and '799 applications are hereby incorporated in their entireties by this reference.

FIELD OF THE INVENTION

The field of the invention relates to passenger seats or the like, and more particularly to lightweight components of passenger seats.

BACKGROUND

There has been continuous movement in carrier industries, particularly with air carriers, to move towards passenger seats that are lighter, simpler, and easier to manufacture and assemble. Lighter seats offer improved fuel economy, and increase available payload for passengers and luggage. The passenger seat is also a major design feature and the structure that passengers are most often in contact with during travel. As such, there is a simultaneous push for more visually appealing designs and passenger comfort. It is desirable to reduce weight in parts or subassemblies of passenger seats to further these goals.

Traditional passenger seat headrests are manufactured with internal frames that are covered with cushions and outer panels that provide the headrest surface. These headrests can be heavy, bulky, and complex to manufacture.

In certain cases, it may be desirable to provide a headrest with a membrane stretched in tension over a supporting structure. The membrane may be held in tension and provide the support and cushion to a passenger's head without the need for a cushion or heavy internal structure. The membrane may be configured to provide differing levels of support and cushion at different locations, providing enhanced comfort to a passenger. A headrest with membrane may support a number of aesthetic features, like colors, logos, or other visually pleasing designs, eliminating the need for outer panels. The combination of structure, support, and outer visual appearance further simplifies and lightens the headrest.

SUMMARY

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various aspects of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

According to certain embodiments of the present invention, a suspension headrest may comprise a perimeter frame that may comprise a forward side, an aft side, and an open central region. A suspension membrane may be affixed to the forward side of the perimeter frame. The suspension membrane may be held in tension across the open central region of the perimeter frame and may deflect into the open central region when load is applied to the suspension membrane.

In some embodiments, the perimeter frame may comprise a rounded rectangle. The perimeter frame may comprise a curve such that the forward side of the perimeter frame is substantially concave and the aft side of the perimeter frame is substantially convex.

In certain embodiments, the suspension membrane may comprise a mesh.

In some embodiments, the suspension membrane may comprise a two-way stretch fabric. The suspension membrane may further comprise a four-way stretch fabric.

In certain embodiments, the tension of the suspension membrane in a first direction may be different from the tension of the suspension membrane in a second direction orthogonal to the first direction.

In some embodiments, the suspension headrest may further comprise at least one cross member spanning the open central region on the aft side of the perimeter frame, wherein the at least one cross member partially defines an expansion space. The at least one cross member may be convex with respect to the aft side of the perimeter frame.

In certain embodiments, the at least one cross member may comprise a first cross member and a second cross member. The first cross member may be substantially orthogonal to the second cross member.

In some embodiments, the perimeter frame may deflect to provide support in response to loading. In further embodiments, the perimeter frame and the at least one cross member may deflect to provide support in response to loading.

In certain embodiments, the at least one cross member may comprise a horizontal cross member. The horizontal cross member may be vertically offset.

In some embodiments, the suspension membrane and the perimeter frame may comprise a single molded piece of material of varying thickness.

In certain embodiments, the suspension membrane may comprise an integrated reinforcement selected from the group consisting of foam, woven thread, and sleeved reinforcements.

In some embodiments, the suspension headrest may comprise articulating lateral portions.

In certain embodiments, the suspension headrest may further comprise cushioning material on the at least one cross member.

According to certain embodiments of the present invention, a suspension headrest may comprise a perimeter frame that may comprise a rounded rectangle comprising an open central region, a forward side, and an aft side. A suspension membrane may comprise a two-way stretch fabric held in tension across the forward side of the perimeter frame and spanning the open central region. A vertical cross member may span the aft side of the perimeter frame. A horizontal cross member may span the aft side of the perimeter frame orthogonal to the vertical cross member. The perimeter frame may comprise a curve such that the forward side of the perimeter frame is substantially concave and the horizontal cross member may comprise a curve to follow the profile of the aft side of the perimeter frame.

DETAILED DESCRIPTION

Figure 1:
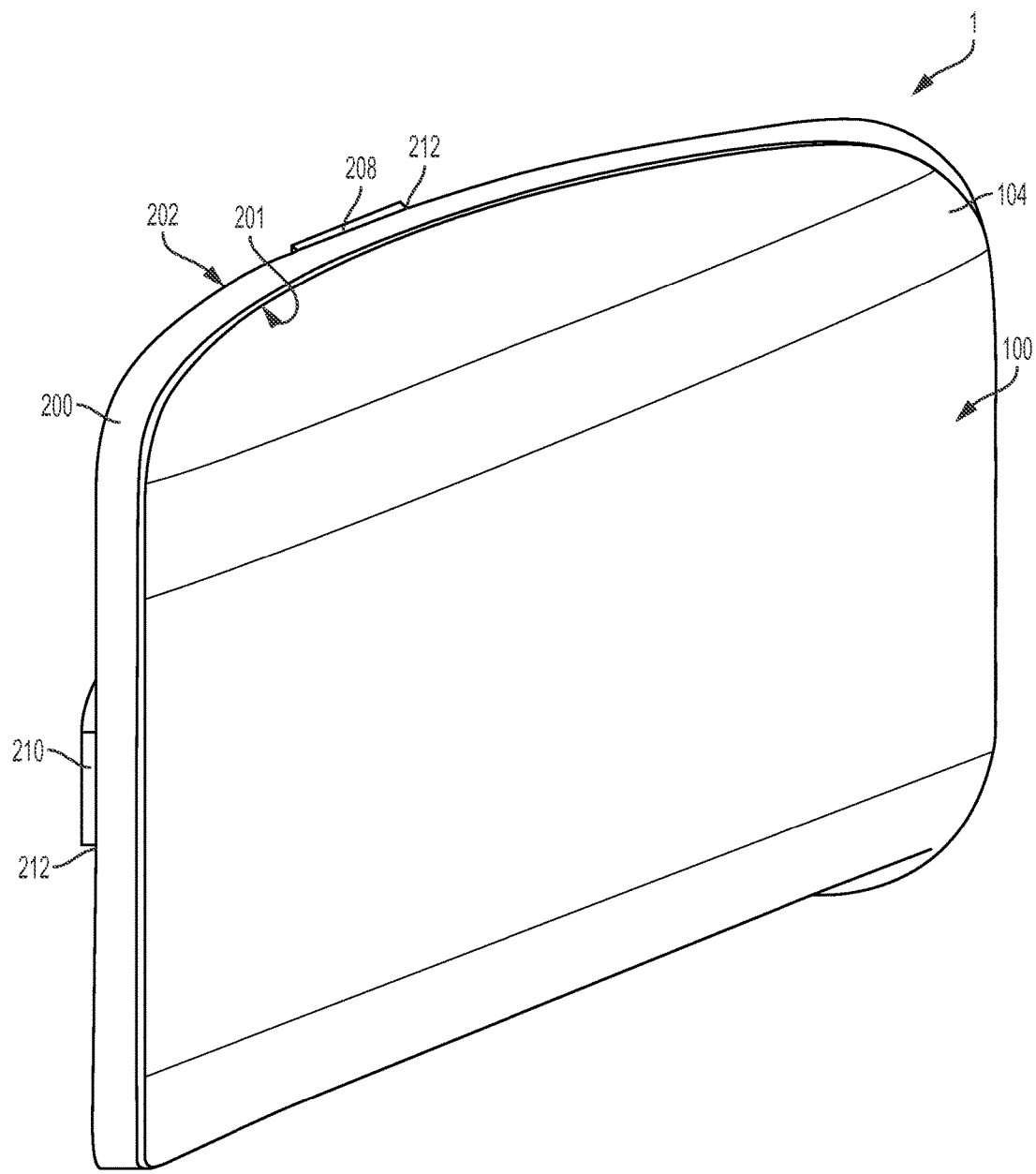
FIG. 1 is a perspective view of a suspension headrest according to certain embodiments of the present invention.
Figure 2:
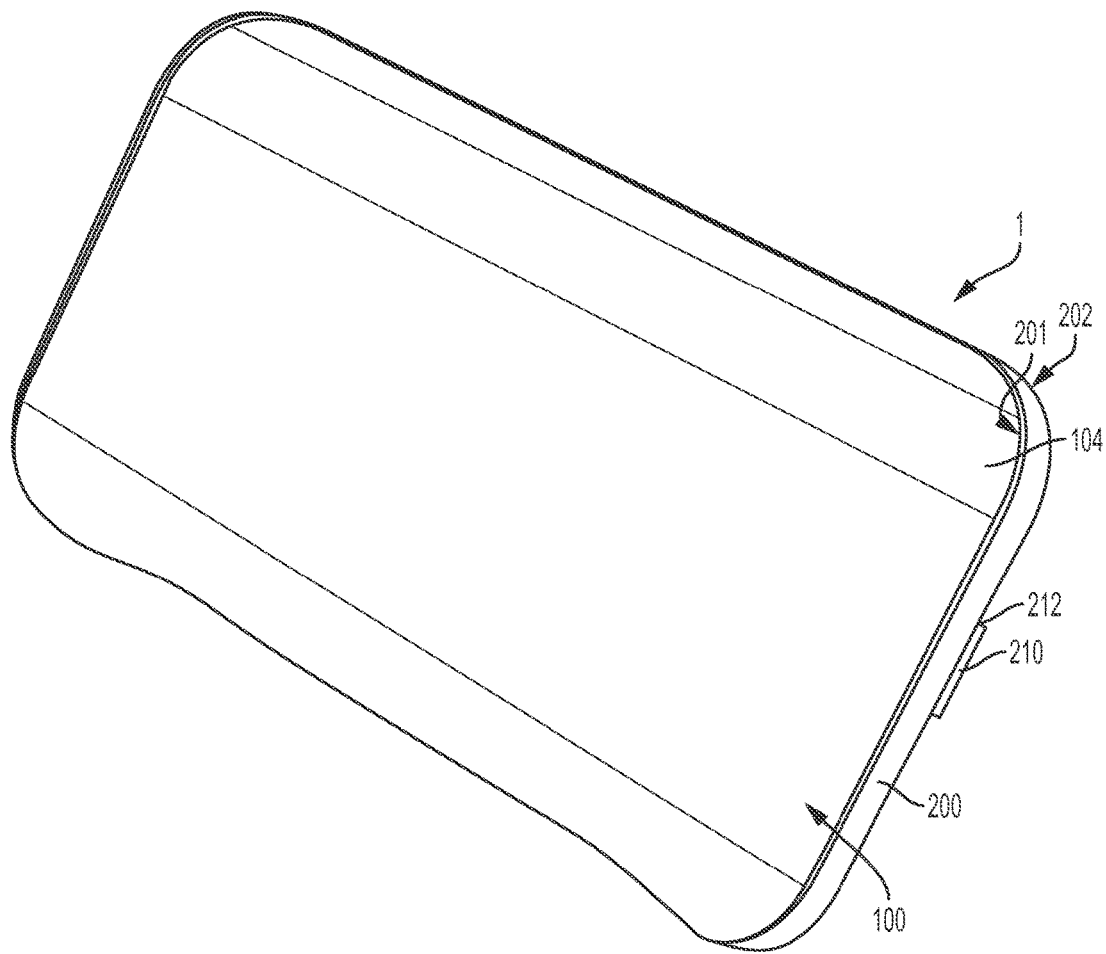
FIG. 2 is a perspective view of the suspension headrest of FIG. 1.
Figure 3:
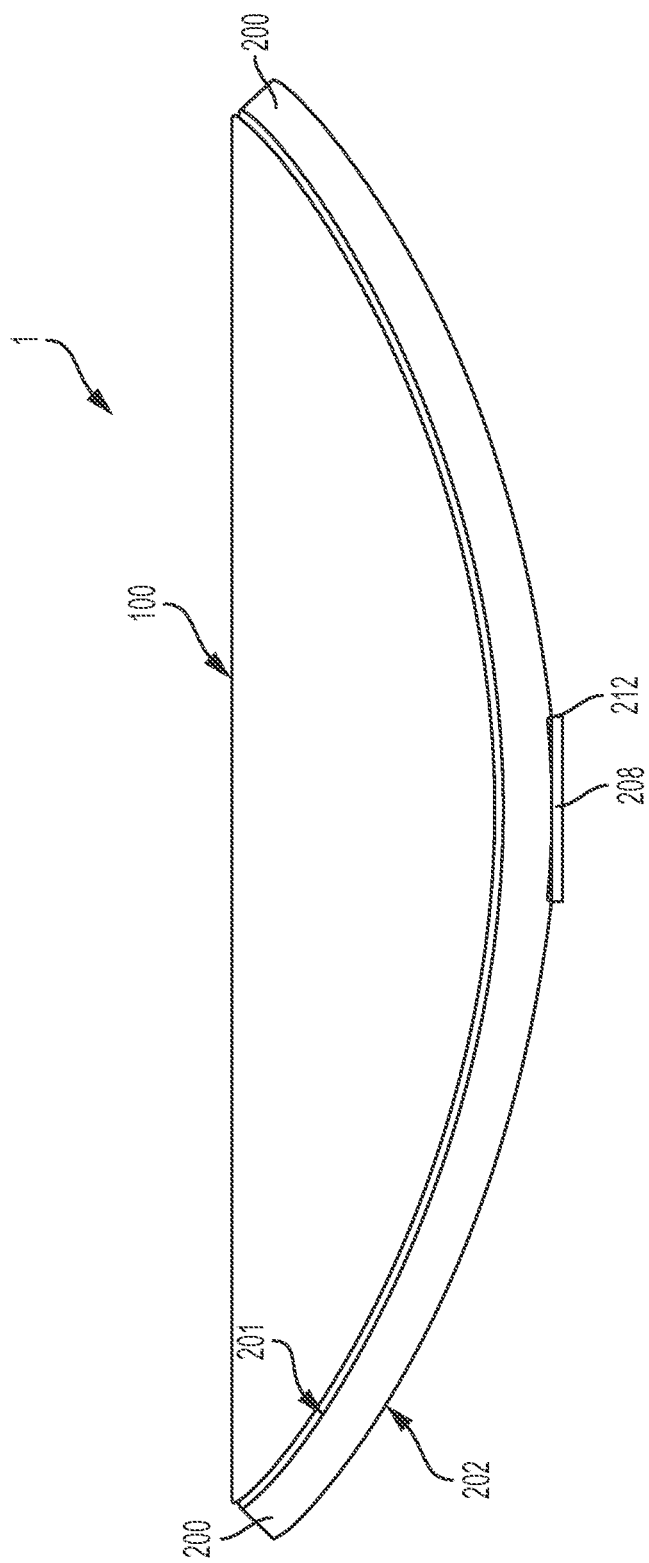
FIG. 3 is a top plan view of the suspension headrest of FIG. 1.

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

The described embodiments of the invention provide a lightweight headrest with a suspension membrane and supporting frame for passenger seats. While the headrests are discussed for use with airline passenger seats, they are by no means so limited. Rather, embodiments of the suspension headrest may be used in any passenger seat including, but not limited to, automotive, marine, bus, train, or other commercial passenger seats.

In some embodiments of the present invention, as shown in FIGS. 1-5, a suspension headrest 1 comprises a perimeter frame 200 with a forward side 201, an aft side 202 and a suspension membrane 100 held in tension across an open central region 203. The suspension membrane 100 serves to support and cushion the load from a passenger head when it is rested against the suspension headrest 1. The suspension membrane 100 may be comprised of any number of materials. However, the suspension membrane 100 is preferably comprised of a material that may flex or deflect under load, and that may support tension loads while maintaining flexibility and resisting permanent deformation. In certain embodiments, the suspension membrane 100 may comprise a polymer, elastomer, two-way stretch fabric, four-way stretch fabric, a mesh, netting, or other material that may remain flexible to cushion and support a head while allowing for the support of loads. In some embodiments, the suspension membrane 100 material may be selected based on an engineering or regulatory standard, such as standards for fire resistance requirements for commercial air travel.

The suspension membrane 100 may be affixed to the perimeter frame 200 in any number of ways as desired or required for a particular application. For example, mechanical fasteners, such as, but not limited to, staples, nails, pins, screws, rivets, or the like may be used to affix the suspension membrane 100 to the perimeter frame 200. In other embodiments, adhesives such as epoxy, glue, or other bonding agents may be used. The suspension membrane 100 may also be formed or molded as an integral part of the perimeter frame 200. The suspension membrane 100 may also be attached to the perimeter frame 200 by wrapping the material of the suspension membrane 100 around the perimeter frame 200 and attaching the suspension membrane 100 material to itself. The self-attachment may be achieved through stitching, adhesion, mechanical fastening, or other attachment means. In certain embodiments, the suspension membrane 100 may be attached to the perimeter frame 200 by placing the two parts together and applying heat such that the material of the suspension membrane 100, perimeter frame 200, or both melts. The suspension membrane 100 and perimeter frame 200 may then be held together from the solidified melt material. It is also possible, and in some cases desirable, to form or mold the suspension membrane 100 and perimeter frame 200 as a single piece of material. By selectively increasing or decreasing the thickness of the material, a suspension membrane 100 that is flexible may be integrally molded with a relatively stiffer perimeter frame 200 as a single piece while still providing the function of a multiple-part suspension headrest 1.

The perimeter frame 200 may be planar, or may have a curved shape such that the forward side 201 of the perimeter frame 200 is generally concave in at least one dimension, and the aft side 202 of the perimeter frame 200 is generally convex in at least one dimension. The perimeter frame 200 may feature additional support or structure from optional vertical cross member 208 and/or horizontal cross member 210 that may be attached to the perimeter frame at attachment points 212. In some embodiments, the vertical cross member 208 and horizontal cross member 210 may pass over or through one another, and may or may not be attached to one another, at the crossover 213.

The suspension membrane 100 can be configured to provide varying degrees of support, deflection, and to tailor these characteristics across the area of the suspension membrane 100 that spans the open central region 203. For example, the suspension membrane 100 may be affixed or attached to the perimeter frame 200 in such a way that the initial tension in one direction is different than the tension in a different direction. In certain embodiments, the suspension membrane 100 may be configured with a higher degree of initial tension in the vertical direction to give additional support to loads in the fore-aft direction, while having less initial tension in the horizontal direction to provide additional cushion for lateral loads. Initial tension of the suspension membrane 100 may also be influenced by the weave of the suspension membrane 100 in applications where the suspension membrane 100 comprises a fabric or woven material. The weave of the suspension membrane 100 may be tighter in one direction compared to another. Similarly, the suspension membrane 100 may have differing types of threads (i.e., stronger or weaker threads) at selected locations throughout its area to provide varying degrees of cushion.

The suspension membrane 100 may also include an integrated reinforcement 104 to provide additional support, enhance comfort, and/or provide additional shape to the suspension membrane 100. In certain embodiments, the suspension membrane 100 may include foam strips, springs, woven in threads, or strips of pre-stressed fabrics as an integrated reinforcement 104 to alter or adapt the amount of cushion or support in the suspension membrane 100 and suspension cushion 1. In other embodiments, the suspension membrane 100 may have sleeves or apertures included that allow insertion of reinforcements similar to those noted above.

The perimeter frame 200 may be constructed from a number of different materials including, but not limited to, injection molded plastic, aluminum, stainless steel, fiber reinforced plastics, carbon fiber, composites, polycarbonate, polypropylene, other metallic materials, or other polymers. The selection of perimeter frame 200 material may be made based on the particular environment or requirements of an application, including anticipated forces, cost of material, cost of manufacture, number of units required, and/or regulatory requirements. For example, the material of the perimeter frame 200 (and also of the vertical cross member 208 and/or horizontal cross member 210) may be selected for compliance with a safety or fire resistance standard, such as those that are often used for commercial airline applications.

The perimeter frame 200 serves to provide support to the suspension membrane 100, and to give shape, structure, and attachment points for the suspension headrest 1. As a result, the geometry of the perimeter frame 200, including the use or omission of cross members 208, 210 may vary depending upon the requirements of any particular application. For example, in certain embodiments, the perimeter frame 200 may be planar without any curvature. In other embodiments, the perimeter frame 200 may have a curvature such that the forward side 201 is concave and the aft side 202 is convex as shown in FIGS. 1-5. The geometry of the perimeter frame 200 may also determine the geometry of the open central region 203 and expansion space 206, which the suspension membrane 100 moves through and into, respectively. The curvature of the perimeter frame 200 may be used to increase the lateral support of the passenger's head, or it may be used to increase the volume of the expansion space 206. For example, the curvature of the perimeter frame 200 may allow for additional deflection of the suspension membrane 100 before it contacts any portions of the perimeter frame 200 or any cross members 208, 210.

Figure 4:
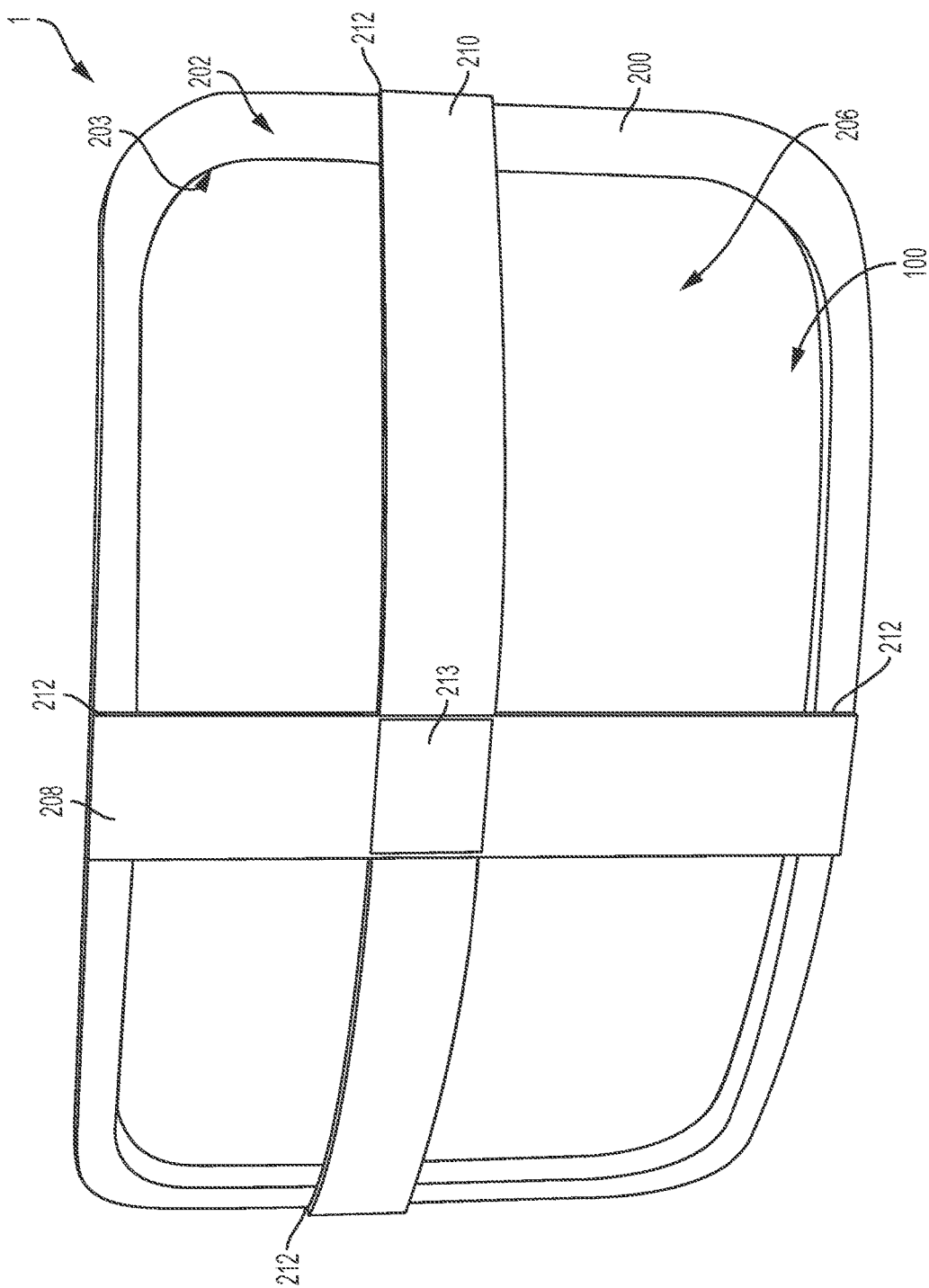
FIG. 4 is a rear perspective view of the suspension headrest of FIG. 1.
Figure 5:
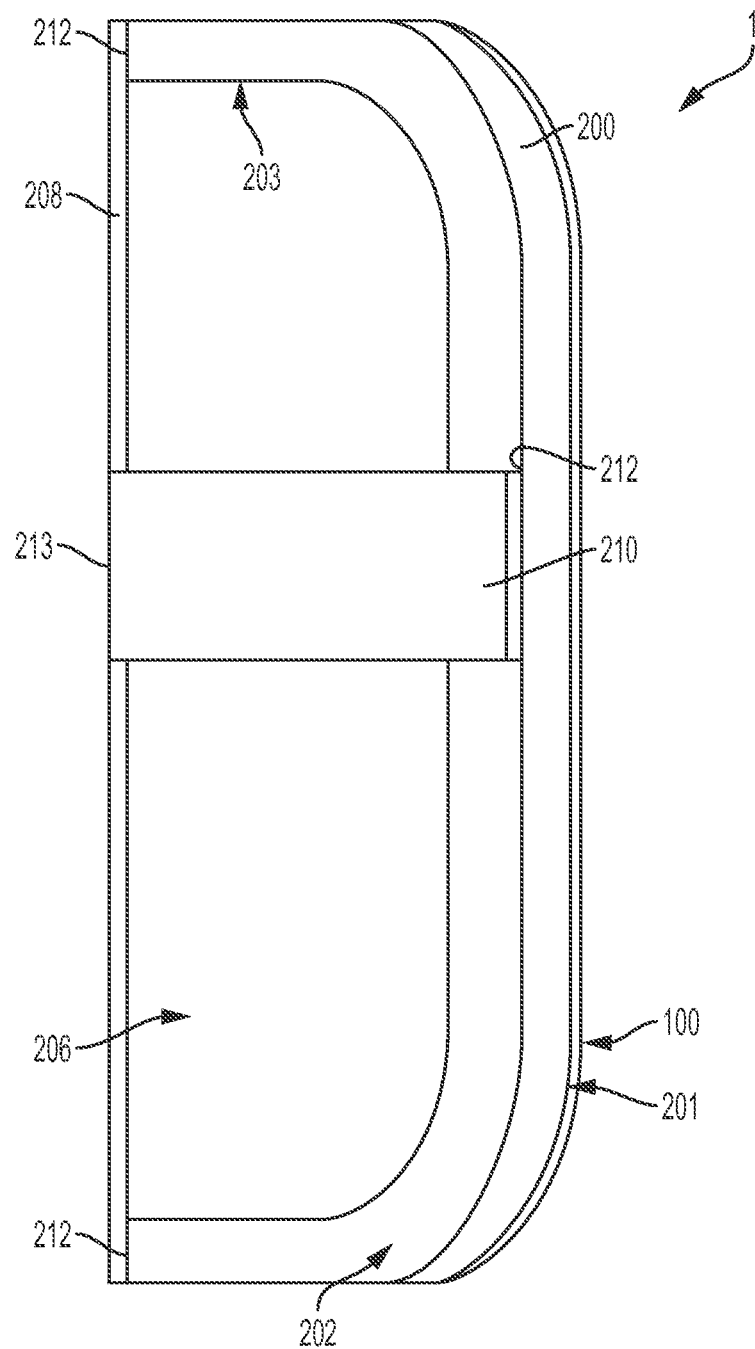
FIG. 5 is a side elevation view of the suspension headrest of FIG. 1.

The suspension headrest 1 may also include a vertical cross member 208 and/or a horizontal cross member 210. These cross members 208, 210 may take on any number of configurations and orientations as desired or required for a particular application. For example, the cross members 208, 210 may be positioned orthogonally to one another as shown in FIG. 4. In certain embodiments, the cross members 208, 210 may be positioned in different orientations and at different angles to one another as they span the open central region 203 of the perimeter frame 200. The cross members 208, 210 may also have different curvatures to provide different shapes and support profiles for the suspension headrest 1. The cross members 208, 210 may have curvatures that generally follow those of the perimeter frame 200, or they may be bowed to a greater or lesser extent than the perimeter frame 200. Adjustments to the curvature of the cross members 208, 210 may also influence the amount of expansion space 206 available in any particular embodiment of the suspension headrest 1. In certain embodiments, the cross members 208, 210 may be located in offset positions. For example, in FIG. 4, the horizontal cross member 210 is located above the center of the perimeter frame 200. Offsetting one or more of the cross members 208, 210 may provide for tailored cushioning and support profiles for passengers of different size and weight. For example, raising or lowering the horizontal cross member 210 may provide for altering the support profile of the suspension headrest 1 to accommodate varying positions of the center of gravity of a passenger head. To facilitate further adjustability, the cross members 208, 210 may be removably affixed to the perimeter frame 200 at the attachment points 212 or other locations along the perimeter frame 200. The cross members 208, 210 may be attached with mechanical fasteners, adhesives, magnets, or they may snap into notches formed or molded into the perimeter frame 200. Similarly, the crossover 213 may feature attachment means between the cross members 208, 210 as with the connection of the cross members 208, 210 to the perimeter frame 200. In certain embodiments, the cross members 208, 210 may be formed or molded as a single piece. In other embodiments, the cross members 208, 210 will not be affixed to one another at the crossover 213, and will independently provide support to the perimeter frame 200.

During use, the perimeter frame 200 and optional cross members 208, 210 may provide a part of the flexibility and cushioning action of the suspension headrest 1. The perimeter frame 200 and cross members 208, 210 may be formed of materials or given geometries that allow them to deflect and function as springs. In certain embodiments, the load of the passenger's head will be absorbed by the suspension membrane 100, the perimeter frame 200, and/or the cross members 208, 210 deflecting and supporting loads as group.

The cross members 208, 210 may be lined with a cushioning material, such as, but not limited to, foam or another compressible material. The foam (not shown) would allow for cushioning of the passenger's head in an emergency maneuver, accident, or any other situation where the force of the passenger head on the suspension membrane 100 is great enough that the suspension membrane 100 may deflect to an extent that contact between the passenger head and cross members 208, 210 may occur.

Still referring to FIGS. 1-5, the suspension headrest 1 may support and cushion the head and neck of a passenger through the deflection of the suspension membrane 100 through the open central region 203 of the perimeter frame 200. When a passenger head is placed upon or rested against the suspension headrest 1, the suspension membrane 100, which is held in an initial state of tension because it is stretched across the perimeter frame 200, will deflect from its initial position in an aft direction generally through the open central region 203 of the perimeter frame 200 and into the expansion space 206. As the suspension membrane 100 is displaced, the level of tension in the suspension membrane 100 will increase from its initial state, and take up the load of the passenger's head. In certain embodiments, the suspension membrane 100 may take up all of the load of the passenger's head during normal use without the passenger head contacting the perimeter frame 200, or the optional vertical cross member 208 and/or optional horizontal cross member 210. However, in some embodiments, perimeter frame 200, vertical cross member 208, and/or horizontal cross member 210 may be used assist the suspension membrane 100 and partially support the passenger's head. Furthermore, in certain situations with higher than normal loads, such as during a crash, emergency maneuver, or other incident, the suspension membrane 100 may deflect to a degree that the passenger's head may contact the perimeter frame 200, vertical cross member 208, and/or horizontal cross member 210. In these circumstances, the perimeter frame 200, vertical cross member 208, and/or horizontal cross member 210 may be lined with a cushioning material, such as rubber, foam, or another compressible material, to enhance passenger comfort and safety.

Figure 6:
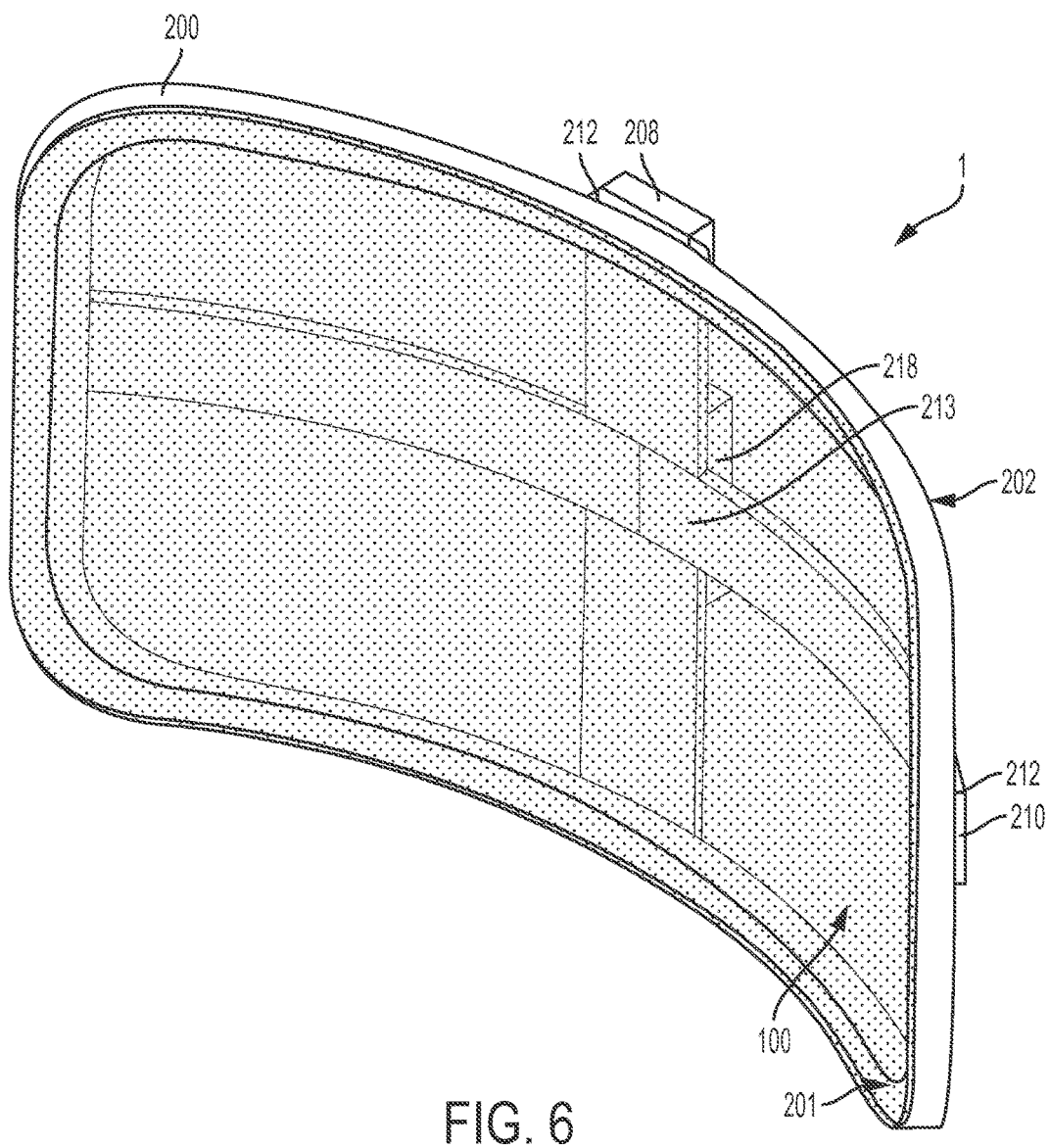
FIG. 6 is a perspective view of a suspension headrest according to certain embodiments of the present invention.

FIG. 6 is a perspective view of a suspension headrest 1 comprising a perimeter frame 200 with a suspension membrane 100 affixed to the forward side 201 of the perimeter frame 200. The suspension membrane 100 spans an open central region 203 of the perimeter frame 200 in tension. The suspension headrest 1 also includes a vertical cross member 208 and a horizontal cross member 210, which are attached to the aft side 202 of the perimeter frame 200 at attachment points 212. In certain embodiments, the vertical cross member 208 and the horizontal cross member 210 may overlap, pass over, or pass through one another at crossover 213. At crossover 213, the vertical cross member 208 and the horizontal cross member 210 may be affixed to one another, or they may not be attached to one another. In certain embodiments, a mount 218 may be affixed at the crossover 213 or alone the vertical cross member 208 or the horizontal cross member 210. The mount 218 allows the suspension headrest 1 to be attached or affixed to a passenger seat (not shown). The mount 218 can be either a fixed mount, or a pivoting, rotating, or sliding mount that allows for adjusting the position and angle of the suspension headrest 1. In certain embodiments, the mount 218 allows the suspension headrest 1 to maintain the same level of movement as a traditional headrest.

Figure 7:
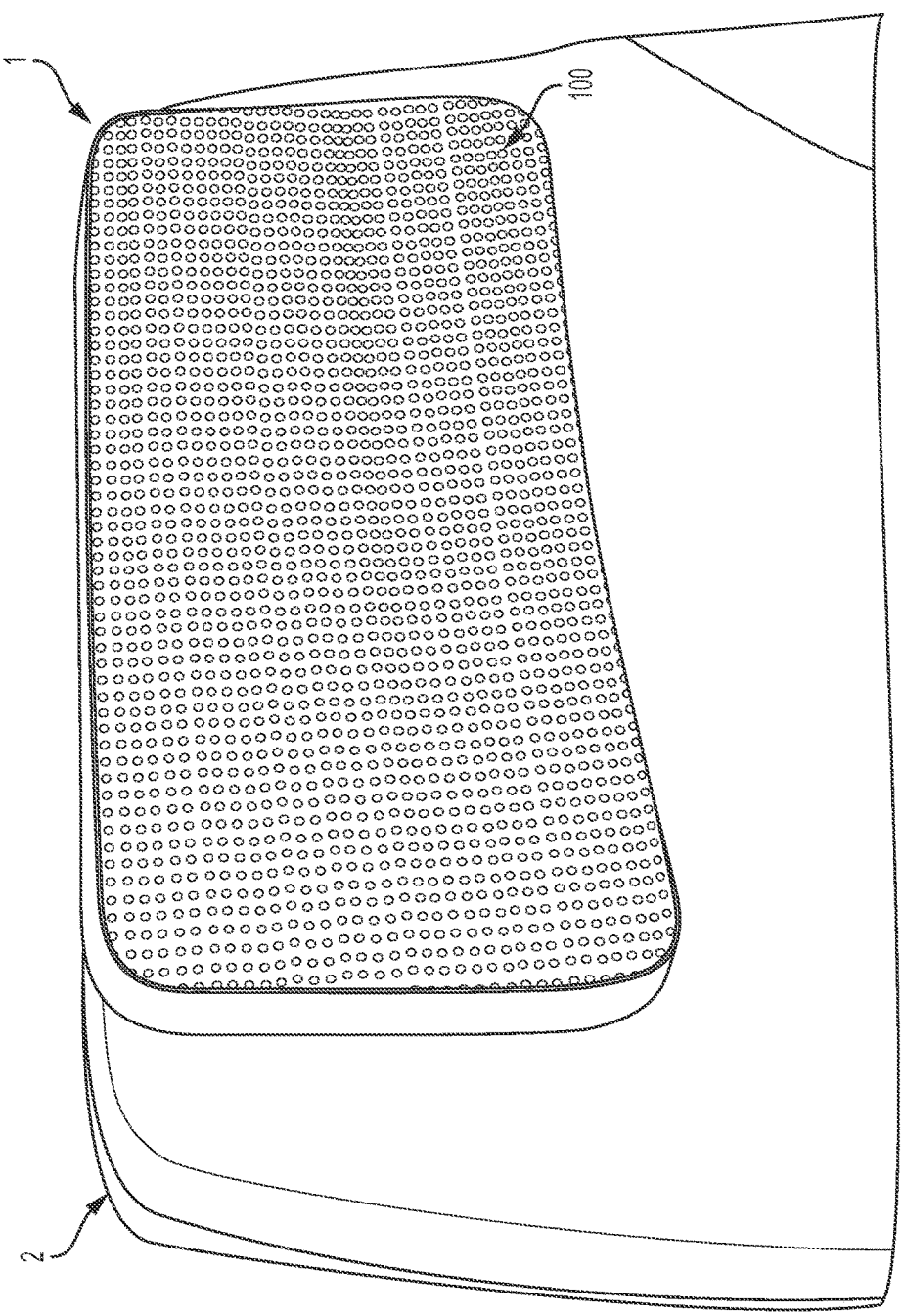
FIG. 7 is a perspective view of a suspension headrest mounted to a passenger seat.

FIG. 7 is a perspective view of a suspension headrest 1 mounted on a passenger seat 2. The suspension headrest 1 comprises a suspension membrane 100. In certain embodiments, as shown in FIG. 7, the suspension membrane 100 may be a mesh, mesh-like, or perforated material. Suspension membrane 100 materials that are perforated, mesh, or otherwise allow for air circulation through the suspension membrane 100 and around the passenger head may reduce heat buildup and perspiration, enhancing passenger comfort.

The suspension headrest 1 may be provided as a retrofit to replace traditional headrests, or it may be included as an integral part to a passenger seat 2. A suspension headrest 1 may offer increased opportunities for customization and decoration to the passenger seat 2. For example, the space inside a suspension headrest 1 that is normally occupied by a cushion may be utilized for integrating speakers or other entertainment devices. The suspension membrane 100, which may be easily replaceable in certain embodiments, may be decorated or styled to contain logos, advertising, or aesthetically pleasing designs and colors. In certain embodiments, the suspension membrane 100 may comprise a mesh material that could have a two-tone or changing appearance by weaving different color threads into the material. In further embodiments, the suspension headrest 1 may not require any additional decorative covering either over the suspension membrane 100 or the perimeter frame 200 and associated parts. The omission of decorative covers may lead to additional weight and cost savings.

A suspension headrest 1 may also offer additional comfort options to the passenger while being lighter and more compact that traditional headrests. For example, the suspension headrest 1 may include articulation points such that lateral portions of the suspension headrest 1 may fold forward to help provide lateral support to a passenger's head. In certain embodiments, the suspension headrest 1 may have a single suspension membrane 100, or it may consist of three individual sections with perimeter frames 200 and suspension membranes 100 connected to form a single suspension headrest 1.

Any of the above described components, parts, or embodiments may take on a range of shapes, sizes, or materials as necessary for a particular application of the described invention. The components, parts, or mechanisms of the described invention may be made of any materials selected for the suitability in use, cost, or ease of manufacturing. Materials including, but not limited to aluminum, stainless steel, fiber reinforced plastics, carbon fiber, composites, polycarbonate, polypropylene, other metallic materials, or other polymers may be used to form any of the above described components.

Different arrangements of the components depicted in the drawings or described above, as well as components and steps not shown or described are possible. Similarly, some features and sub-combinations are useful and may be employed without reference to other features and sub-combinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications may be made without departing from the scope of the claims below.

That which is claimed is:

1. A suspension headrest comprising:
a perimeter frame comprising a forward side, an aft side, and an open central region;
a suspension membrane affixed to the forward side of the perimeter frame; and
at least two cross members spanning the open central region on the aft side of the perimeter frame, wherein:
one of the at least two cross members comprises a vertical cross member with a first attachment point attached to a central location of an upper portion of the perimeter frame and a second attachment point attached to a central location of a lower portion of the perimeter frame; and
the suspension membrane is held in tension across the open central region of the perimeter frame and may deflect into the open central region when load is applied to the suspension membrane.

2. The suspension headrest of claim 1, wherein the perimeter frame comprises a rounded rectangle.

3. The suspension headrest of claim 1, wherein the perimeter frame comprises a curve such that the forward side of the perimeter frame is substantially concave and the aft side of the perimeter frame is substantially convex.

4. The suspension headrest of claim 1, wherein the suspension membrane comprises a mesh.

5. The suspension headrest of claim 1, wherein the suspension membrane comprises a two-way stretch fabric.

6. The suspension headrest of claim 1, wherein the suspension membrane comprises a four-way stretch fabric.

7. The suspension headrest of claim 1, wherein the tension of the suspension membrane in a first direction is different from the tension of the suspension membrane in a second direction orthogonal to the first direction.

8. The suspension headrest of claim 1, wherein the at least two cross members further comprise a horizontal cross member comprising a first attachment point attached to a left portion of the perimeter frame and a second attachment point attached to a right portion of the perimeter frame.

9. The suspension headrest of claim 8, wherein the horizontal cross member comprises a curve that follows a shape of the aft side of the perimeter frame.

10. The suspension headrest of claim 8, wherein the vertical cross member and the horizontal cross member intersect one another at a location that is approximately aligned with the first and second attachment points of the vertical cross member.

11. The suspension headrest of claim 8, wherein the vertical cross member is substantially orthogonal to the horizontal cross member.

12. The suspension headrest of claim 1, further comprising a mount attached to an aft side of at least one of the at least two cross members such that the suspension headrest is configured to attach to a passenger seat at the mount.

13. The suspension headrest of claim 12, wherein the mount is attached to an intersection of the vertical cross member and a horizontal cross member on a rear side of the suspension headrest.

14. The suspension headrest of claim 8, wherein the horizontal cross member and the vertical cross member each have approximately the same cross-section.

15. The suspension headrest of claim 14, wherein the horizontal cross member is located closer to the upper portion of the perimeter frame compared to the lower portion of the perimeter frame.

16. The suspension headrest of claim 1, wherein the suspension membrane and the perimeter frame comprise a single molded piece of material of varying thickness.

17. The suspension headrest of claim 1, wherein the suspension membrane comprises an integrated reinforcement selected from the group consisting of foam, woven thread, and sleeved reinforcements.

18. The suspension headrest of claim 1, wherein the suspension headrest comprises articulating lateral portions.

19. The suspension headrest of claim 1, further comprising a cushioning material on at least one of the at least two cross members.

20. A suspension headrest comprising:
   a perimeter frame comprising a rounded rectangle comprising an open central region and a forward side and an aft side;
   a suspension membrane comprising a fabric held in tension across the forward side of the perimeter frame and spanning the open central region;
   a vertical cross member spanning the aft side of the perimeter frame, wherein the vertical cross member comprises a first attachment point attached to a central location of an upper portion of the perimeter frame and a second attachment point attached to a central location of a lower portion of the perimeter frame; and
   a horizontal cross member spanning the aft side of the perimeter frame, wherein the horizontal cross member comprises a first attachment point attached to a left side portion of the perimeter frame and a second attachment point attached to a right side portion of the perimeter frame and is positioned orthogonal to the vertical cross member;
   wherein the perimeter frame comprises a curve such that the forward side of the perimeter frame is substantially concave and the horizontal cross member comprises a curve to follow the profile of the aft side of the perimeter frame.

21. The suspension headrest of claim 20, wherein the horizontal cross member is located closer to the upper portion of the perimeter frame compared to the lower portion of the perimeter frame.

22. The suspension headrest of claim 20, wherein the vertical cross member and the horizontal cross member each have approximately the same cross-section.

23. The suspension headrest of claim 20, further comprising a mount attached to an aft side of an intersection of the vertical cross member and the horizontal cross member such that the suspension headrest is configured to attach to a passenger seat at the mount.

24. The suspension headrest of claim 20, wherein the vertical cross member and the horizontal cross member intersect one another at a location that is approximately aligned with the first and second attachment points of the vertical cross member.

* * * * *